INVENTOR.
RICHARD H. ENGELMANN
ATTORNEY

June 16, 1964  R. H. ENGELMANN  3,137,163
METHOD OF AND MEANS FOR MEASURING TORQUE
OF AN ELECTRIC MOTOR DRIVE
Filed Jan. 4, 1962  2 Sheets-Sheet 2
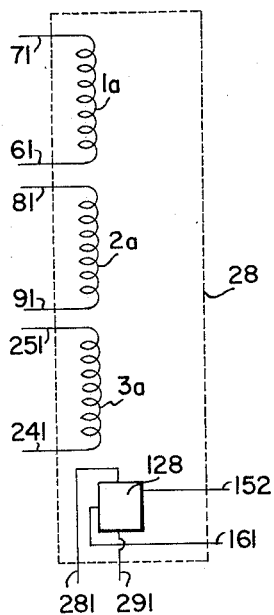
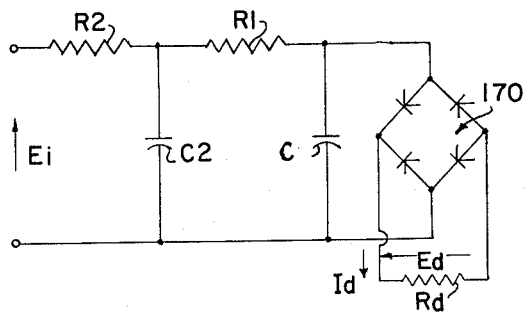
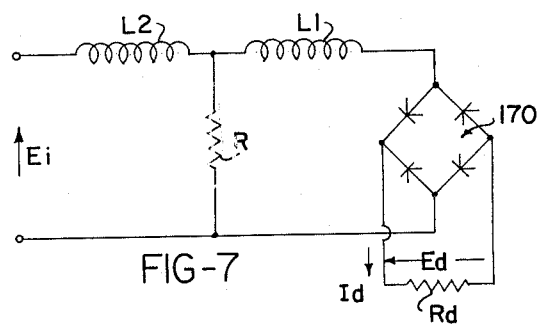
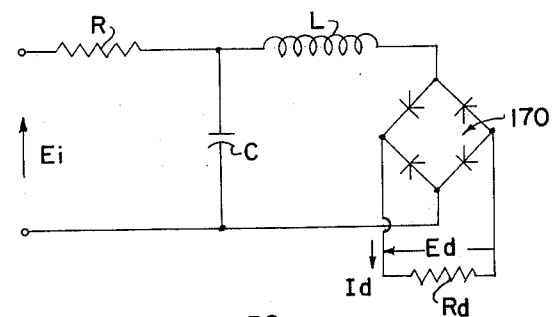
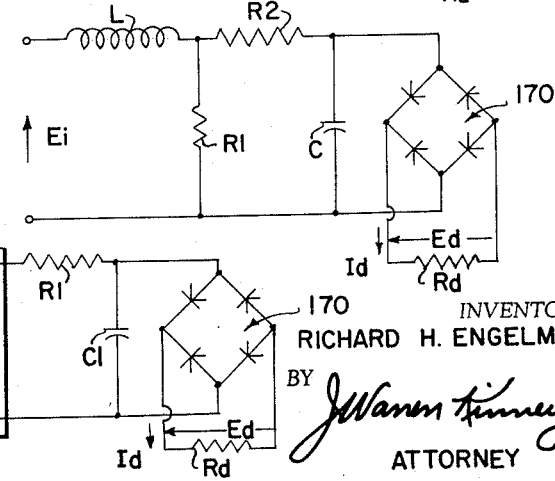
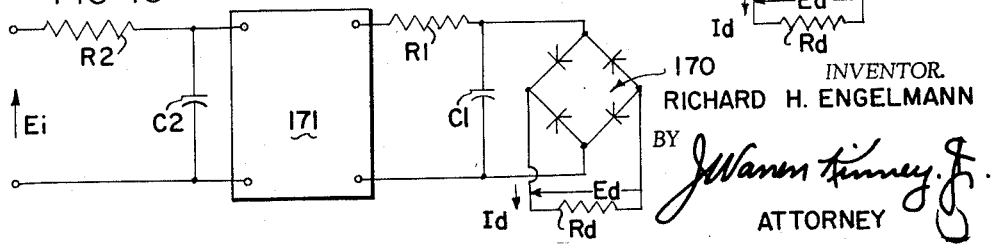
INVENTOR.
RICHARD H. ENGELMANN
BY
J. Warren Kinney Jr.
ATTORNEY

United States Patent Office 3,137,163
Patented June 16, 1964

3,137,163
METHOD OF AND MEANS FOR MEASURING TORQUE OF AN ELECTRIC MOTOR DRIVE
Richard H. Engelmann, Cincinnati, Ohio, assignor to Jack N. Binns, Cincinnati, Ohio
Filed Jan. 4, 1962, Ser. No. 164,322
15 Claims. (Cl. 73—136)

This invention relates to direct current electric motors, and more particularly to a method of and means for continuously and automatically measuring and indicating, and, if desired, recording the torque developed by direct current electric motors under load. It constitutes an improvement on the invention disclosed in my patent application dated October 27, 1959, Serial No. 849,044, which matured into U.S. Patent 3,019,640, and is distinguished from the invention there disclosed in that it removes the necessity for approximating the generated voltage in the armature, $E_g$, by use of the applied source voltage, V. As a result, a more accurate indication of torque is obtained than under the previously disclosed invention, especially with low supply voltages and high armature currents, a combination which results in considerable error in the torque measurement if the approximation above is used.

A second object of this invention is to provide alternate networks for the Butterworth and Tchebysheff networks used in the previous invention.

The manner in which these objectives are attained is described below and by reference to the drawings, in which:

FIG. 5 is a schematic diagram of the Hall effect generator employed in the system of FIG. 4.

Figure 1:
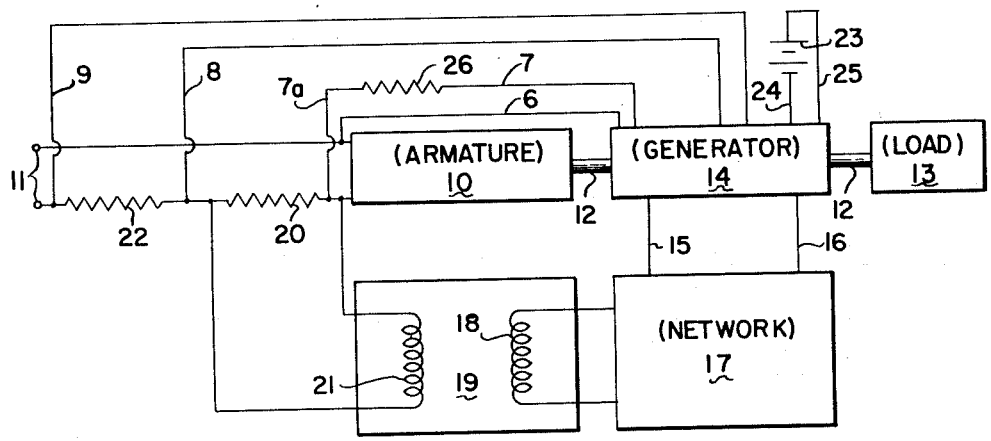
FIG. 1 is a diagrammatic view of a system embodying an improved form of my invention utilizing a variable field alternating current generator.
Figure 4:
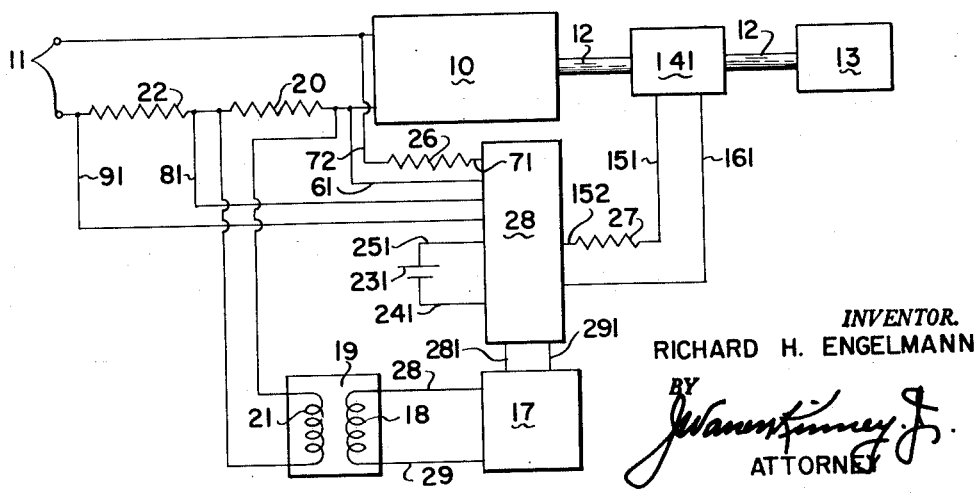
FIG. 4 is a diagrammatic view of a system embodying a form of the invention utilizing a fixed-field alternating current generator and a Hall effect generator.

FIGS. 6, 7, 8, 9, and 10 are various networks which may be used as network 17 in FIGS. 1 and 4.

The torque developed by a direct current (D.C.) motor is proportional to the product of the average flux per pole and the armature current. The torque T may be expressed by the equation (1) $$T = K_1 \theta I_a$$

where $T$ = torque developed by the motor
$K_1$ = a motor constant which is dependent on the number of armature conductors, paths through the armature, poles, etc.
$\theta$ = average flux per pole and
$I_a$ = armature current It is desirable to eliminate the flux $\theta$ from consideration, since means for direct measurement of flux are inherently unsatisfactory. Flux measurement may be made indirectly by a method based on the equation (2) $$E_g = K_2 \theta N$$

where $E_g$ = the generated voltage in the armature
$K_2$ = a motor constant dependent in general on the same motor properties as $K_1$, and
$N$ = armature speed Equations 1 and 2 may be combined to eliminate the flux $\theta$ and yield an equation for torque as follows:

(3) $$T = \frac{K_1 E_g I_a}{K_2 N}$$

In my previous disclosure it was assumed that $E_g$ is equal to the applied source voltage V. It is an object of the present invention to eliminate the necessity for this approximation in order to improve the accuracy of torque measurement.

The generated voltage in the armature, $E_g$, differs from the applied source voltage, V, because of the voltage drop in the armature, compensating field, if present, interpoles, if present, and series field, if present, and because of the voltage drop between brushes and commutator, so that (4) $$E_g = V - I_a R_a -$$

(brush drop), where $R_a$ = the resistance of the armature together with such other fields as are present in the armature circuit between the points at which V is measured, which may be across the entire armature circuit, including the armature, brushes, and such fields as are used in the armature circuit, or may be arranged to eliminate some or all of those fields, but in any case will include the brushes and the armature itself.

The voltage drop between brushes and commutator is substantially constant, and is usually taken as 2 volts total.

Figure 2:
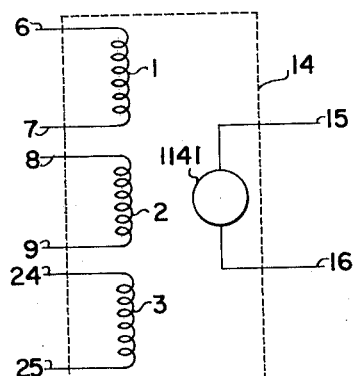
FIG. 2 is a schematic diagram of the alternating current generator employed in the system of FIG. 1.

In order to effect the subtraction required by Equation 4, a number of means may be used. The means illustrated by FIGS. 1 and 2 is similar to the means illustrated by FIG. 1 of my previous disclosure, the difference being in the construction of the alternating current generator 14. In FIG. 1, D.C. motor armature 10 is supplied by a source of D.C. power through lines 11. The shunt field of this motor, if present, may be connected to the same source as the armature, or to some other source. Resistors 20 and 22 are usually of low value in order to reduce the voltage drop across them. Armature 10 is mechanically connected to generator 14 and load 13 by shaft 12. The output of generator 14 is an alternating voltage, whose amplitude is dependent on the product of the armature speed and the generator excitation, and having a frequency dependent on the speed of the armature. This output is connected to network 17, which may be comprised of an appropriate Butterworth or Tchebysheff network and associated transformers and rectifiers as required, all as described in my previous disclosure, or which may be comprised of an appropriate network of the type disclosed below.

The function of this network, as previously disclosed, is to cause the output voltage and current of the network to be directly proportional to the amplitude of the output voltage of the generator, and inversely proportional to the frequency of the output voltage of the generator, and hence inversely proportional to the speed of the armature. Hence the output current is proportional to $E_g/N$, provided that the generator excitation is proportional to $E_g$. This output current from the network is conducted to winding 18 of a dynamometer type instrument 19, the other winding (21) of which is supplied by a portion of the armature current due to the drop across resistor 20. Thus the deflection of the indicator of meter 19 is proportional to $E_g I_a / N$, and its scale may be calibrated in units of torque.

In order to cause the generator excitation to be proportional to the armature generated voltage $E_g$, three windings may be used for the field of generator 14 as shown in FIG. 2. These windings are connected as shown in FIG. 1 to three sources of excitation: One winding is connected across the motor armature by means of conductors 6, 7, and 7a, and resistor 26; consequently the current in this winding is proportional to supply voltage V. A second winding is connected by means of conductors 8 and 9 to the ends of resistor 22, which is in series with the motor armature; consequently the current in this winding is proportional to armature current $I_a$. The third winding is connected by conductors 24 and 25 to a fixed D.C. source, shown as battery 23; consequently the current in this winding is constant. If the numbers of turns on the windings, their resistances, the values of resistors 22 and 26, and the fixed D.C. source voltage 23 are all properly chosen, and if care is taken as well that the magnetomotive forces produced by the second and third windings referred to above are in opposition to the magnetomotive force produced by the first winding, then the flux in generator 14 will be proportional to $$V - I_a R_a - (\text{brush drop})$$

or armature generated voltage $E_g$.

If we designate the windings as 1, 2, and 3, as shown in FIG. 2, we may specify the number of turns on each winding as $N_1$, $N_2$, and $N_3$, respectively, the sum of the resistance of winding 1 and resistor 26 as $R_1$, the resistance of winding 2 as $R_2$, and that of winding 3 as $R_3$, the current flowing in winding 1 as $I_1$, that in winding 2 as $I_2$, and that in winding 3 as $I_3$, resistor 22 as $R_{22}$, and D.C. source voltage 23 as $V_3$. The net magnetomotive force, M, is given by (5) $$M = N_1 I_1 - N_2 I_2 - N_3 I_3$$

and the flux in generator 14 and consequently the voltage generated in its armature 1141 will be directly proportional to M, providing only that saturation of the magnetic circuit in generator 14 is avoided.

Now, (6) $$I_1 = \frac{V}{R_1}, I_2 = \frac{I_a R_{22}}{R_2 + R_{22}}, \text{ and } I_3 = \frac{V_3}{R_3}$$

Therefore, (7) $$M = \frac{N_1}{R_1} V - \frac{N_2 R_{22}}{R_2 + R_{22}} I_a - \frac{N_3}{R_3} V_3$$

(8) $$\frac{R_1 M}{N_1} = V - \frac{N_2 R_1 R_{22}}{N_1 (R_2 + R_{22})} I_a - \frac{N_3 R_1}{N_1 R_3} V_3$$

If we now compare this last equation term by term with Equation 4, we see that (9) $$E_g = \frac{R_1 M}{N_1}$$

(10) $$\begin{cases} \text{and} \\ R_a = \frac{N_2 R_1 R_{22}}{N_1 (R_2 + R_{22})} \\ \text{Brush drop} = \frac{N_3 R_1}{N_1 R_3} V_3 \end{cases}$$

From knowledge of the armature circuit resistance $R_a$ and the brush drop of D.C. motor armature 10, it is now possible to select values for $N_1$, $N_2$, $N_3$, $R_1$, $R_2$, $R_{22}$, $R_3$, and $V_3$ which will satisfy Equations 10, and as a result the magnetomotive force M will be directly proportional to $E_g$ as shown by Equation 9. It may be noted in passing that design Equations 10 have only two known quantities ($R_a$ and brush drop) and eight unknown quantities, so that six of the unknown quantities may be selected, and the other two can then be solved for. This is not an uncommon situation in design problems.

We therefore see that the output voltage of generator 14 can be made directly proportional to the generated voltage $E_g$ of D.C. motor armature 10, and the approximation made in my previous disclosure is therefore no longer required.

The operation of the remainder of the system is as detailed in my previous disclosure for the case in which generator 14 is excited from the supply voltage V and one winding of the dynamometer movement is excited by a portion of armature current $I_a$.

It should be understood that various modifications may be made without departing from the scope of the invention. For example, generator 14 may be driven indirectly from shaft 12 by a fixed ratio drive. Either winding 2 or winding 3, or both, may be left unconnected or omitted from the structure in cases where the voltage drop $I_a R_a$ or the brush drop, or both, is a small portion of the supply voltage V, or where required accuracy is low.

If it is desired to excite the generator by a portion of the armature current, it is still possible to avoid approximating generated armature voltage E by source voltage V by using three windings in the dynamometer meter in place of the winding excited by the source voltage V in my previous disclosure. All three windings would have to be placed on the fixed structure of the dynamometer meter, or all three on the movable structure; placement on the fixed structure would be preferred. These coils would have numbers of turns, resistances, and supply voltage $V_3$ proportioned in accordance with Equations 10, current directions and winding directions being such that the subtraction dictated by Equation 4 will occur, the net result being that one of the M.M.F.'s produced in the dynamometer meter would be directly proportional to $E_g$. The current and hence the M.M.F. produced by the other field structure of the meter would be directly proportional to armature current $I_a$, and inversely proportional to D.C. motor armature speed N, such a result being obtained by reason of the characteristics of generator 14 and network 17, as described above and also in my previous disclosure. Simplifications similar to those described above may be made in cases in which brush drop or armature voltage drop $I_a R_a$, or both, is negligible.

In order to avoid the unusual structure of the dynamometer meter described above, it is also possible to utilize a meter consisting, in essence, of three dynamometer movements, the moving coils of which are all connected together mechanically on a common shaft. In such a device, for example, all three movable coils could be connected in series, and excited by a current proportional to $I_a/N$. One of the fixed windings could carry a current proportional to V, another could carry a current proportional to $I_a R_a$, and the third could carry a constant current proportional to the brush drop. By proper connections, the torques due to those movements carrying currents proportional to $I_a R_a$ and to the brush drop can be made to subtract from the torque due to the movement carrying a current due to V, so that Equation 4 is satisfied by a subtraction of torques, rather than a subtraction of magnetomotive forces as described above.

Figure 3:
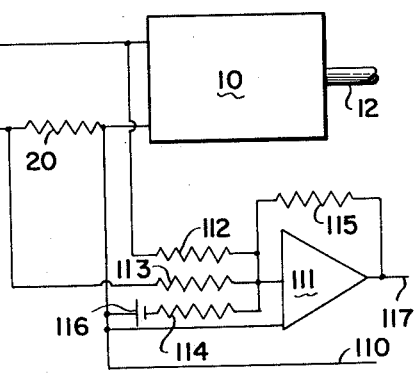
FIG. 3 is a diagrammatic view of a system embodying an operational amplifier used as a summing device for purposes set forth below.

Still another means which may be used to achieve the desired result is illustrated diagramatically in FIG. 3, in which conductor 110 is a common conductor for operational amplifier 111, having input resistors 112, 113 and 114, and feedback resistor 115. Proper selection of these resistors and of voltage supply 116 will cause the output voltage of amplifier 111, as measured between conductors 117 and 110, to be proportional to $E_g$ as required by Equation 4, the input voltage to resistor 112 being proportional to V, that to resistor 113 being proportional to $I_a R_a$, and the input voltage 116 to resistor 114 being proportional to brush drop, all these input voltages having the proper polarities to accomplish the subtraction required by Equation 4. The method of selection of resistors 20, 112, 113, 114 and 115, and voltage supply 116 is well known to those skilled in the art of analog computation.

The voltage between conductors 117 and 110 may be used to excite a variable field generator 14 driven by armature 10, the output of the generator being passed through a network such as 17 in FIG. 1 to one winding of a dynamometer type meter movement, the other winding of which is excited by a portion of the armature current $I_a$, which may be done by connecting it across resistor 22. Alternately, the voltage between conductors 117 and 110 may be used to excite one winding of a dynamometer movement, the other winding being excited by the output of a network such as 17, in FIG. 1, which network in turn is driven by the output of a generator connected to the D.C. motor armature 10 mechanically, and excited by the armature current $I_a$. In either case, the dynamometer meter movement will have a deflection proportional to $E_g I_a/N$, and hence to the torque developed by the D.C. motor.

Still another means by which the necessary subtraction of Equation 4 may be accomplished is shown in FIGS. 4 and 5. In FIG. 4, D.C. motor armature 10 is again connected to supply lines 11 through resistors 20 and 22, and in turn drives a fixed-field alternating current generator 141 through shaft 12, either directly or through an appropriate fixed ratio drive. The output of generator 141 is used to provide through resistor 27 the control current for the Hall generator 28, which has as other inputs currents proportional to source voltage V, armature resistance drop $I_a R_a$, and brush drop. Hall generator 28 is shown in more detail in FIG. 5, and is described in more detail below. The output of Hall generator 28 is fed to network 17, which has the same function as network 17 in FIG. 1 of this and my previous disclosure. The output of network 17 causes a current flow in winding 18 of dynamometer meter movement 19, this current being proportional to $E_g/N$. Winding 21 of movement 19 is excited by a current proportional to armature current $I_a$, due to the voltage drop across resistor 20.

Consider now FIG. 5, which shows Hall generator 28 in more detail. As used in this invention, it consists of windings $1_a$, $2_a$, and $3_a$, placed on a suitable magnetic core which is not shown. The flux from this magnetic structure is directed through Hall wafer 128. Winding $1_a$ carries a current proportional to armature supply voltage V, winding $2_a$ carries a current proportional to armature resistance drop $I_a R_a$, and winding $3_a$ carries a current proportional to the brush drop. The number of turns on each winding, resistances of each winding, values of resistors 22 and 26, and selection of source voltage 231, is accomplished in such a manner that Equations 10 are again satisfied. Proper selections of winding directions and current directions will insure the necessary subtraction of magnetomotive forces, as described above and dictated by Equation 4.

As a result, the net magnetomotive force and hence the flux and flux density in the magnetic circuit of the Hall generator 28 is directly proportional to armature generated voltage $E_g$, as long as the magnetic core does not approach saturation.

Hall wafer 128 is a semi-conductor device having the following construction and properties. The Hall wafer here used would normally be in the shape of a rectangular parallelepiped, having one dimension much smaller than either of the others. The magnetic flux is directed parallel to this short dimension. Along one of the other axes a control current is passed, being led in and out in this case by conductors 152 and 161. Along the third axis a voltage $V_H$ is produced, which may be measured between conductors 281 and 291. Thus, the magnetic flux, control current, and generated voltage $V_H$ are directed along mutually perpendicular axes. The generated voltage $V_H$ has the property that it is proportional to the instantaneous product of the flux density and the control current.

In the arrangement of FIGS. 4 and 5, the control current has an amplitude and a frequency both of which are proportional to speed. The flux density is proportional to armature generated voltage $E_g$, and is unidirectional. The generated voltage $V_H$ therefore has an amplitude proportional to the product of $E_g$ and N, with a frequency proportional to N. The generated voltage $V_H$ therefore possesses the necessary properties for application to network 17, so that the output current of network 17 will be directly proportional to $E_g$ and inversely proportional to N, in accordance with my previous disclosure.

In summary, the first object of this invention has been met, in that a method has been disclosed for increasing the accuracy of torque measurement in D.C. electric motors by removing the necessity for approximating armature generated voltage $E_g$ by use of supply voltage V. Armature generated voltage $E_g$ may be accurately measured, or may be approximated to a desired degree of accuracy by omitting either the $I_a R_a$ term or the brush drop term from Equation 4, or both. Secondly, several means have been described by which this accurate measurement of $E_g$ may be made, although other variations and combinations of the means disclosed will be obvious to those skilled in the art.

A second object of this invention is to provide alternate configurations of network 17, which was specified in my previous disclosure as a network of either the Butterworth or Tchebysheff type. FIGS. 6, 7, 8, and 9 show four possible networks for accomplishing the necessary processing of the input voltage $E_i$, that is, for causing the output current $I_d$ to be directly proportional to the magnitude of the input voltage, and inversely proportional to the square of the frequency of the input voltage. It should be understood that transformers at the input end of these networks, or at the output end (that is, at the input to the rectifiers) may be used without departing from the scope of the invention as set forth below. It should also be understood that the use of amplifiers at either input end or output end of the network, or in the interior of the network (after the first L-section, for example, as shown in FIG. 10) does not depart from the scope of this invention. In each of these networks $R_d$ is the resistance of winding 18 of dynamometer movement 19.

The ratios of output current $I_d$ to input voltage $E_i$ for these networks is as follows:

(11)
$$\left|\frac{I_d}{E_i}\right| = \left|\frac{(\sqrt{2}/\pi) R_d}{(jw)^2 R_1 R_2 C_1 C_2 + jw\left(\frac{R_1 R_2}{R_d} C_2 + R_2 C_1 + R_2 C_2 + R_1 C_1\right) + \frac{R_1 + R_2 + R_d}{R_d}}\right|$$

for the network of FIG. 6.

(12)
$$\left|\frac{I_d}{E_i}\right| = \left|\frac{(2\sqrt{2}/\pi) R_d}{(jw)^2 \frac{L_1 L_2}{R R_d} + jw\left(\frac{L_2}{R} + \frac{L_1 + L_2}{R_d}\right) + 1}\right|$$

for the network of FIG. 7.

(13)
$$\left|\frac{I_d}{E_i}\right| = \left|\frac{(2\sqrt{2}/\pi) R_d}{(jw)^2 \frac{LCR}{R_d} + jw\left(RC + \frac{L}{R_d}\right) + \frac{R}{R_d} + 1}\right|$$

for the network of FIG. 8.

(14)
$$\left|\frac{I_d}{E_i}\right| = \left|\frac{(2\sqrt{2}/\pi) R_d}{(jw)^2 LC\left(1 + \frac{R_2}{R_1}\right) + jw\left(\frac{L}{R_d} + \frac{R_2 L}{R_1 R_d} + \frac{L}{R_1} + R_2 C\right) + \frac{R_2}{R_d} + 1}\right|$$

for the network of FIG. 9.

In each of Equations 11, 12, 13 and 14, current $I_d$ is a direct current, while voltage $E_i$ is an alternating voltage. The presence of the full-wave rectifier 170 in each of these circuits accounts for the factor $2\sqrt{2}/\pi$ in each numerator. If a half wave rectifier is used, the factor would be $\sqrt{2}/\pi$.

Each of Equations 11—14 is distinguished by the fact that the denominator contains a constant term, a term proportional to the frequency, and a term proportional to the square of the frequency, while the numerator contains only a constant. In consequence of the presence of the term proportional to the square of the frequency, it is always possible to utilize a frequency sufficiently high that the entire denominator may be approximated by the term proportional to the square of the frequency, and in consequence the output current $I_d$ will be directly proportional to the input voltage $E_i$; and inversely proportional to the square of the frequency of the input voltage. Obtaining a frequency which is sufficiently high that this is true requires proper selection of generator 14 or 141, the ratio of any fixed ratio drive which may be used between the D.C. motor armature and the generator, as well as the values of the circuit elements of the networks.

Formulation of frequency limitations in general terms cannot be accomplished for these networks as they could for the Butterworth and Tchebysheff networks of my previous disclosure. In general, however, the presence of the dissipative elements (resistances) in the networks, requires that they be used at relatively higher normalized frequencies than the Butterworth and Tchebysheff networks in order to achieve a given degree of accuracy of approximation.

In order to illustrate another possibility which yields a somewhat different form of network response, reference is now made to FIG. 10, in which an amplifier 171 is added to the network of FIG. 6 after the first L-section. The ratio of output current to input voltage is $$\left|\frac{I_d}{E_i}\right| = \left|\frac{(2\sqrt{2A}/\pi)R_d}{(jw)^2 R_1 R_2 C_1 C_2 + jw\left(R_1 C_1 + R_2 C_2 + \frac{R_1 R_2 C_2}{R_d}\right) + \frac{R_1 + R_d}{R_d}}\right|$$

where $A$=the gain of the amplifier, which is assumed to have infinite input impedance and zero output impedance. Since the constant term and the term proportional to frequency in the denominator are smaller than in Equation 11, this network will produce a given degree of accuracy of approximation at a somewhat lower frequency than the network of FIG. 6 from which it was derived. Similar improvements can be made with each of the other networks shown.

While certain specific networks have been shown and analyzed in order to show the possibility of using networks other than the Butterworth and Tchebysheff previously used, it must be understood that this improvement is not limited to the networks shown, but includes broadly networks which may be active as in FIG. 10, active with feedback, passive as in FIGS. 6, 7, 8, and 9, and with or without transformers as discussed above, the only requirement being that the order of the denominator of the ratio of output current to input voltage, written as a polynomial in $jw$, be two higher than the order of the numerator, also written as a polynomial in $jw$.

The variable $jw$ used in the foregoing paragraph and in Equations 11, 12, 13, 14 and 15 consists of the product of $j$, which is the square root of minus one, and $w$, which is the angular frequency in radians per second, or $2\pi$ times the frequency in cycles per second of the output of the generator 14.

It should be understood that various modifications and changes may be made, within the scope of the appended claims, without departing from the spirit of the invention.

What is claimed is:
1. A method of measuring the torque developed by an electric D.C. motor while driving a load, which method consists in developing a torque meter current that is linearly proportional to the motor armature current, developing a second torque meter current that is directly proportional to the voltage generated across the armature of the motor and inversely proportional to the r.p.m. of the motor shaft and developing the product of said torque meter currents, said product being proportional to the torque developed by the motor.

2. A method of measuring the torque developed by a D.C. electric motor while driving a load, which method consists in developing a torque meter current that is linearly proportional to the voltage generated across the armature of the motor, developing a second torque meter current that is directly proportional to armature current and inversely proportional to the r.p.m. of the motor shaft and developing the product of said torque meter currents, said product being proportional to the torque developed by the motor.

3. A method of measuring the torque developed by a D.C. electric motor, which method consists in developing a current flow proportional to the armature current, developing an A.C. voltage whose magnitude is proportional to the r.p.m. of the motor shaft and to the voltage generated across the armature of the motor and with a frequency proportional to the r.p.m. of the motor shaft, converting said A.C. voltage to D.C. current which is inversely proportional to the said frequency and passing said currents through relatively movable coil windings having linking magnetic fields to produce a deflection representative of the torque of the motor.

4. A method of measuring the torque developed by a D.C. electric motor, which method consists in developing a current flow proportional to the voltage generated across the armature of the motor, developing an A.C. voltage whose magnitude is proportional to the r.p.m. of the motor shaft and to the armature current, and with a frequency proportional to the r.p.m. of the motor shaft, converting said A.C. voltage to D.C. current which is inversely proportional to said frequency and passing said currents through relatively movable coil windings having linking magnetic fields to produce a deflection representative of the torque of the motor.

5. Apparatus for measuring the torque developed at the shaft of an electric motor driving a load, comprising a meter having separate and relatively movable coil windings, conductor means supplying to one of said windings a D.C. current that is a function of the motor armature current, an A.C. generator driven by the motor shaft, said generator adapted to develop an A.C. voltage whose magnitude is proportional to the r.p.m. of said motor shaft and to the voltage generated across the armature of the motor and with a frequency proportional to the r.p.m. of said motor shaft, means rectifying said A.C. voltage and developing a second D.C. current which is inversely proportional to the r.p.m. of said motor shaft, and means conducting said second D.C. current to another of said meter windings whereby the relative motion of the meter windings represents the motor torque.

6. Apparatus for measuring the torque developed at the shaft of an electric motor driving a load, comprising a meter having separate and relatively movable coil windings, conductor means supplying to one of said windings a D.C. current that is a function of the voltage generated across the armature of the motor, an A.C. generator driven by the motor shaft, said generator adapted to develop an A.C. voltage whose magnitude is proportional to the r.p.m. of said motor shaft and to the motor armature current and with a frequency proportional to the r.p.m. of said motor shaft, means rectifying said A.C. voltage and developing a second D.C. current which is inversely proportional to the r.p.m. of said motor shaft, and means conducting said second D.C. current to another of said meter windings whereby the relative motion of the meter windings represents the motor torque.

7. The method of measuring the torque developed by an electric D.C. motor while driving a load, which method consists in developing a torque meter current that is linearly proportional to the motor armature current, developing a second torque meter current that is directly proportional to the voltage generated across the armature of the motor by subtracting from a voltage proportional to the supply voltage voltages proportional to the armature brush drop and the armature IR drop, said second torque meter current being inversely proportional to the r.p.m. of the motor shaft and developing the product of said torque meter currents, said product being proportional to the torque developed by the motor.

8. The method of measuring the torque developed by an electric D.C. motor while driving a load, which method consists in developing a torque meter current that is linearly proportional to the motor armature current, developing a second torque meter current that is directly proportional to the voltage generated across the armature of the motor by subtracting from a magnetomotive force proportional to the supply voltage magnetomotive forces proportional to the armature brush drop and the armature IR drop, said second torque meter current being inversely proportional to the r.p.m. of the motor shaft and developing the product of said torque meter currents, said product being proportional to the torque developed by the motor.

9. The method of measuring the torque developed by an electric D.C. motor while driving a load, which method consists in developing a torque meter current that is linearly proportional to the motor armature current and inversely proportional to motor speed, passing said torque meter current through one of the relatively movable windings of each of a plurality of dynamometer type meters having a common shaft, and passing currents proportional to armature supply voltage, brush drop and armature IR drop, respectively, through the other of the relatively movable windings of said meters whereby the individual torques produced on said common shaft by the currents proportional to the brush drop and armature IR drop are in opposition to the torque due to the current proportional to the armature supply voltage for producing a net torque on said common shaft which is directly proportional to the product of the voltage generated across the armature of the motor and the armature current and inversely proportional to the motor speed.

10. The method of measuring the torque developed by an electric D.C. motor while driving a load, which method consists in developing a torque meter current that is linearly proportional to the motor armature current and inversely proportional to motor speed, passing said torque meter current through the movable winding of a dynamometer type meter, passing currents proportional to armature supply voltage, brush drop and armature IR drop, respectively, through fixed windings of said meter whereby the net magnetomotive force produced by the currents in the fixed windings is proportional to the voltage generated across the armature of the motor so that the torque produced on the shaft of the said meter is directly proportional to the product of generated voltage of the motor and armature current and inversely proportional to motor speed.

11. The method of measuring the torque developed by an electric D.C. motor while driving a load, which method consists in developing a torque meter current that is linearly proportional to the motor armature current and inversely proportional to motor speed, passing said torque meter current through the fixed winding of a dynamometer type meter having a shaft carrying a plurality of individual windings passing currents proportional to armature supply voltage, brush drop and armature IR drop, respectively, through the movable windings of said meter whereby the net magnetomotive force produced by the currents in the movable windings is proportional to voltage generated across the armature of the motor so that the torque produced on the shaft of the said meter is directly proportional to the product of generated voltage of the motor and armature current and inversely proportional to motor speed.

12. Apparatus for measuring the torque developed by the shaft of an electric motor driving a load, comprising a meter having separate and relatively movable coil windings, conductor means supplying to one of said windings a D.C. current that is a function of the motor armature current, an A.C. generator driven by the motor shaft, said generator adapted to develop a network input A.C. voltage whose magnitude is proportional to the r.p.m. of said motor shaft and to the generated voltage of the motor and with a frequency proportional to the r.p.m. of said motor shaft, means producing a network output A.C. voltage which is directly proportional to the voltage generated across the armature of the motor and inversely proportional to the motor speed, means rectifying the output voltage of said network for developing a second D.C. current, and means conducting said second D.C. current to another of the meter windings whereby the relative motion of the meter windings represents the motor torque.

13. The apparatus described in claim 12, wherein the denominator of the ratio of the output voltage of the network to the input voltage of the network written as a polynomial in $jw$ is of order two higher than the order of the numerator written as a polynomial in $jw$, where $j$ is the square root of minus one, and $w$ is the angular frequency in radians per second of the output voltage of said A.C. generator.

14. Apparatus for measuring the torque developed by the shaft of an electric motor driving a load, comprising a meter having separate and relatively movable coil windings, conductor means supplying to one of said windings a D.C. current that is a function of the voltage generated across the armature of the motor, an A.C. generator driven by the motor shaft, said generator adapted to develop a network input A.C. voltage whose magnitude is proportional to the r.p.m. of said motor shaft and to the armature current of the motor and with a frequency proportional to the r.p.m. of said motor shaft, means for producing a network output A.C. voltage which is directly proportional to the armature current of the motor and inversely proportional to the motor speed, means rectifying the output voltage of said network for developing a second D.C. current, and means conducting said second D.C. current to another of the meter windings whereby the relative motion of the meter windings represents the motor torque.

15. The apparatus described in claim 14 wherein the denominator of the ratio of the output voltage of the network to the input voltage of the network written as a polynomial in $jw$ is of order two higher than the order of the numerator when written as a polynomial in $jw$, where $j$ is the square root of minus one, and $w$ is the angular frequency in radians per second of the output voltage of said A.C. generator.

References Cited in the file of this patent

UNITED STATES PATENTS 3,019,640    Engelmann _____ Feb. 6, 1962